United States Patent
Sato et al.

(10) Patent No.: US 6,554,089 B2
(45) Date of Patent: Apr. 29, 2003

(54) VEHICLE DECELERATION CONTROL APPARATUS AND CONTROL METHOD FOR THE SAME

(75) Inventors: Kunihito Sato, Mishima (JP); Nishiyama Keiichi, Brussels (BE)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/731,670

(22) Filed: Dec. 8, 2000

(65) Prior Publication Data

US 2001/0004028 A1 Jun. 21, 2001

(30) Foreign Application Priority Data

Dec. 16, 1999 (JP) .............................. 11-357761
Apr. 10, 2000 (JP) ........................... 2000-108295

(51) Int. Cl.[7] ................................................ B60T 8/58
(52) U.S. Cl. ........................................ 180/169; 701/70
(58) Field of Search ................................ 180/169, 167, 180/197; 701/70, 79, 83, 84, 96

(56) References Cited

U.S. PATENT DOCUMENTS 5,166,881 A * 11/1992 Akasu .......................... 180/169
5,234,071 A * 8/1993 Kajiwara ...................... 180/169
5,574,644 A * 11/1996 Butsuen et al. .............. 180/169
5,749,426 A * 5/1998 Gilling ......................... 180/167
5,839,534 A * 11/1998 Chakraborty et al. ....... 180/169
6,006,144 A * 12/1999 Takahashi et al. ........... 180/167
6,070,682 A * 6/2000 Isogai et al. ................... 701/70
6,233,515 B1 * 5/2001 Engelman et al. ........... 180/197
6,272,416 B1 * 8/2001 Kuroda et al. ................. 701/70

FOREIGN PATENT DOCUMENTS

JP    A-9-95222     4/1997
JP    A-9-272419    10/1997

* cited by examiner

Primary Examiner—Frank Vanaman
(74) Attorney, Agent, or Firm—Oliff & Berridge PLC

(57) ABSTRACT

The vehicle deceleration control apparatus controls deceleration given to a vehicle according to a distance from a vehicle ahead, which is directly measured or estimated based on an accelerator operating condition, so that the smaller the distance from a vehicle ahead, the greater is an assist deceleration. The vehicle deceleration control apparatus is capable of giving an appropriate deceleration according to traffic conditions.

22 Claims, 12 Drawing Sheets

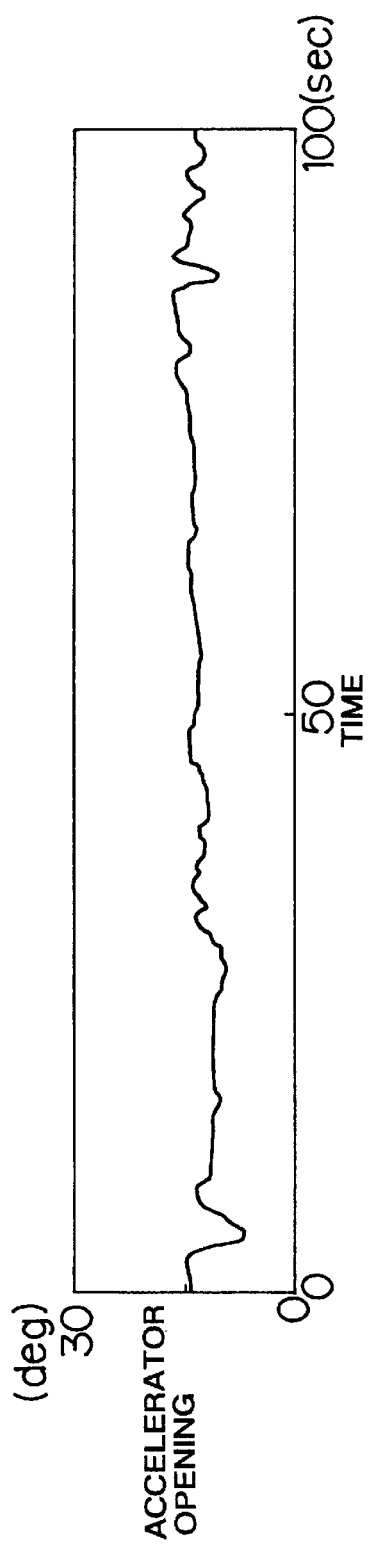
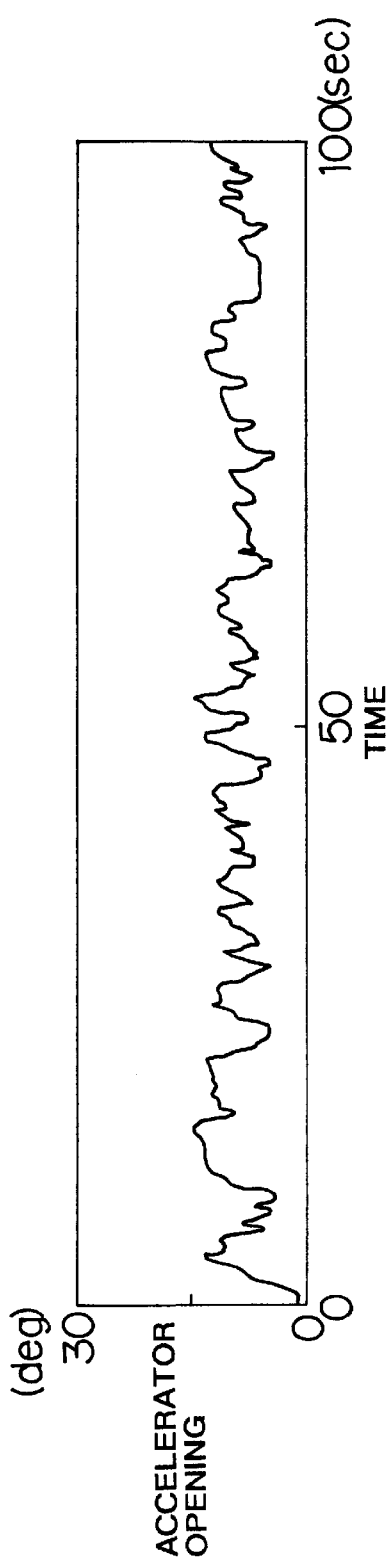

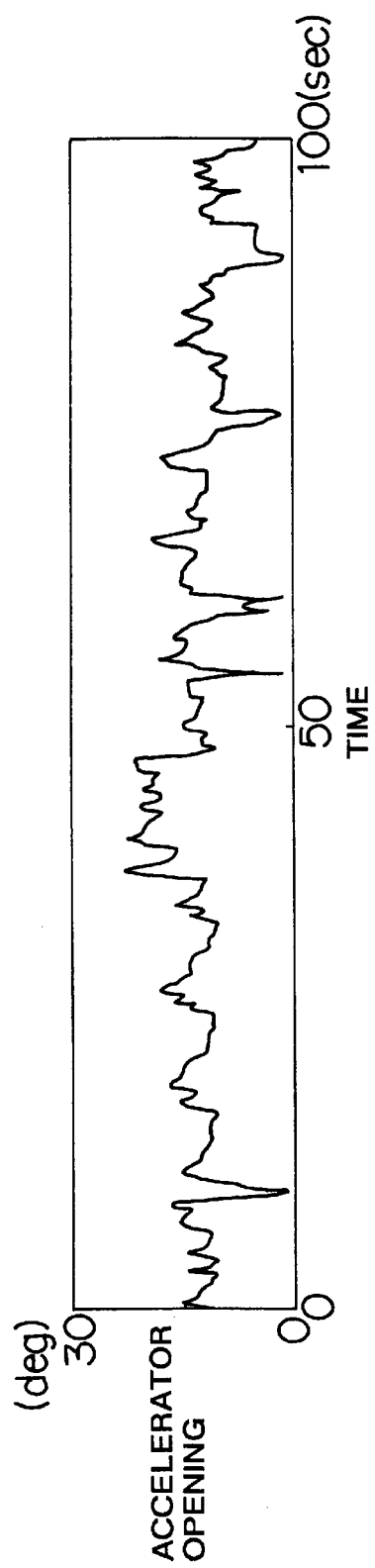
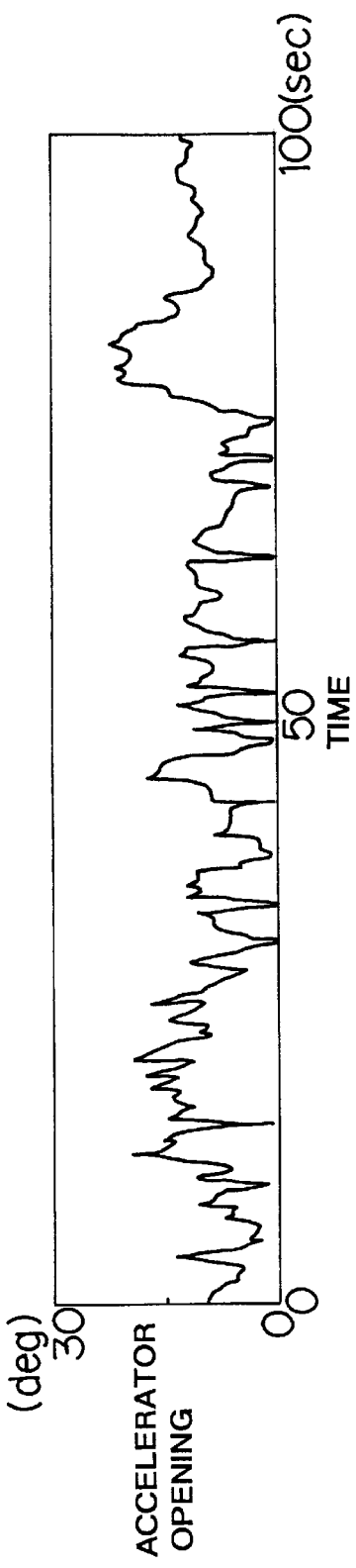

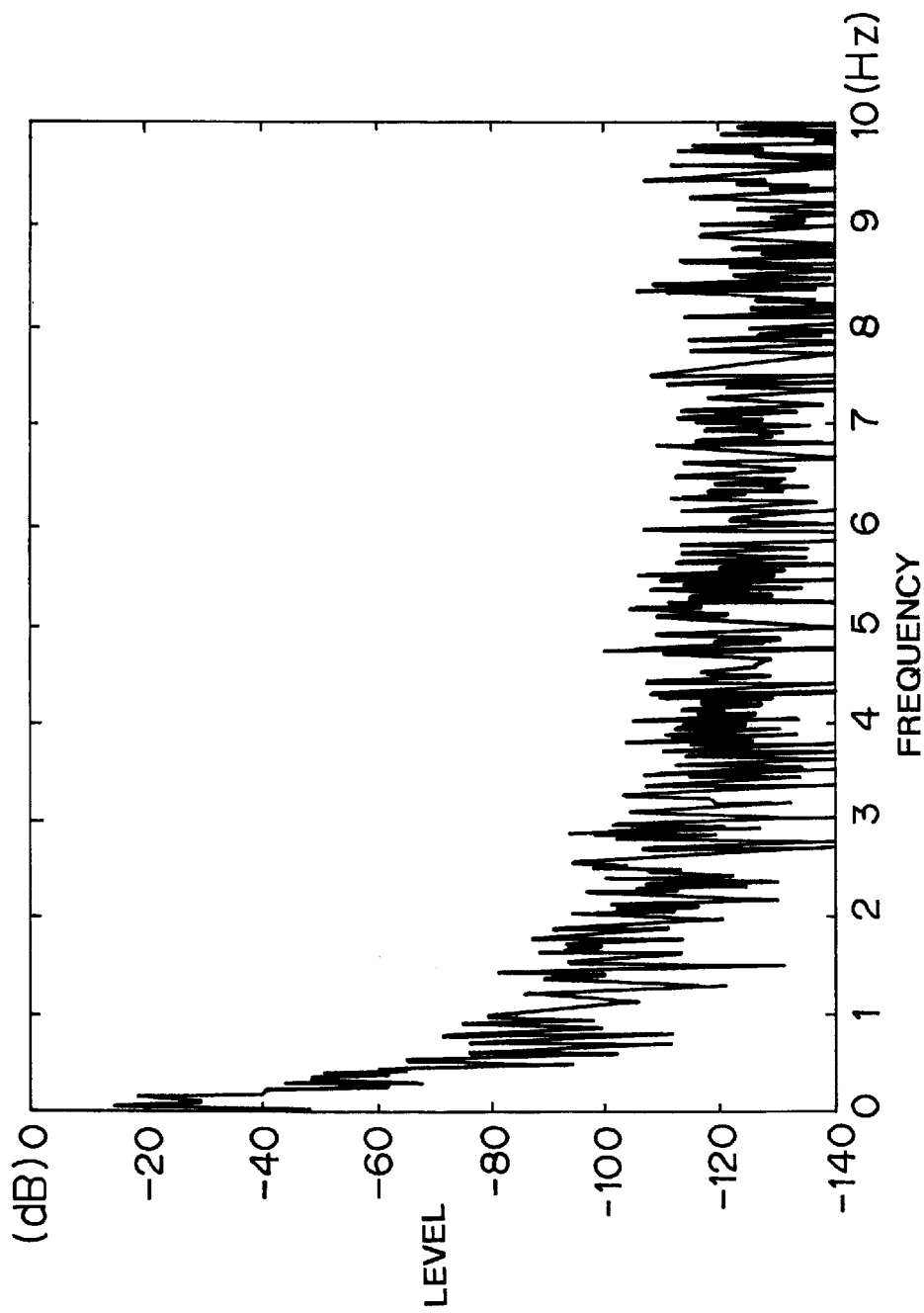

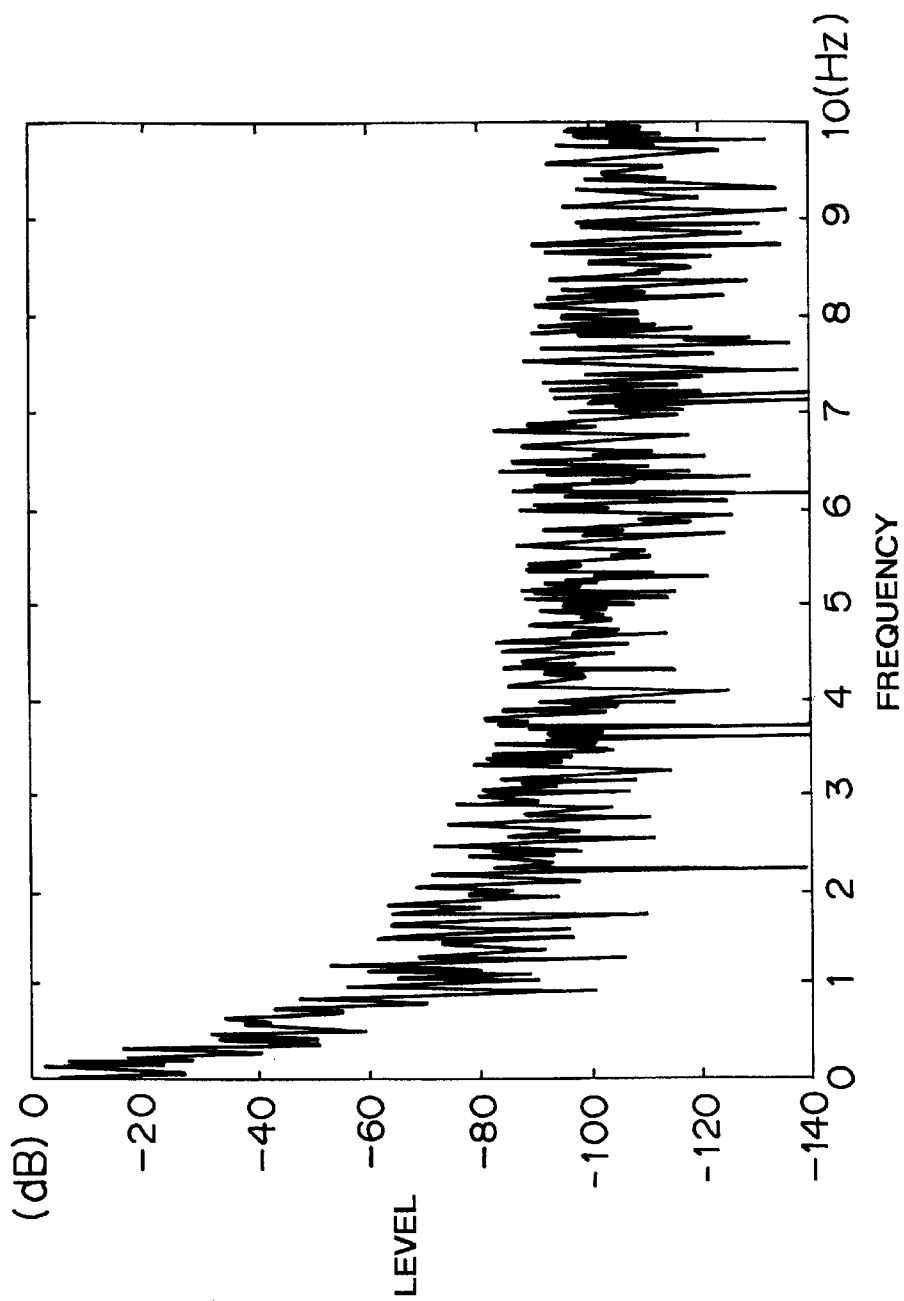

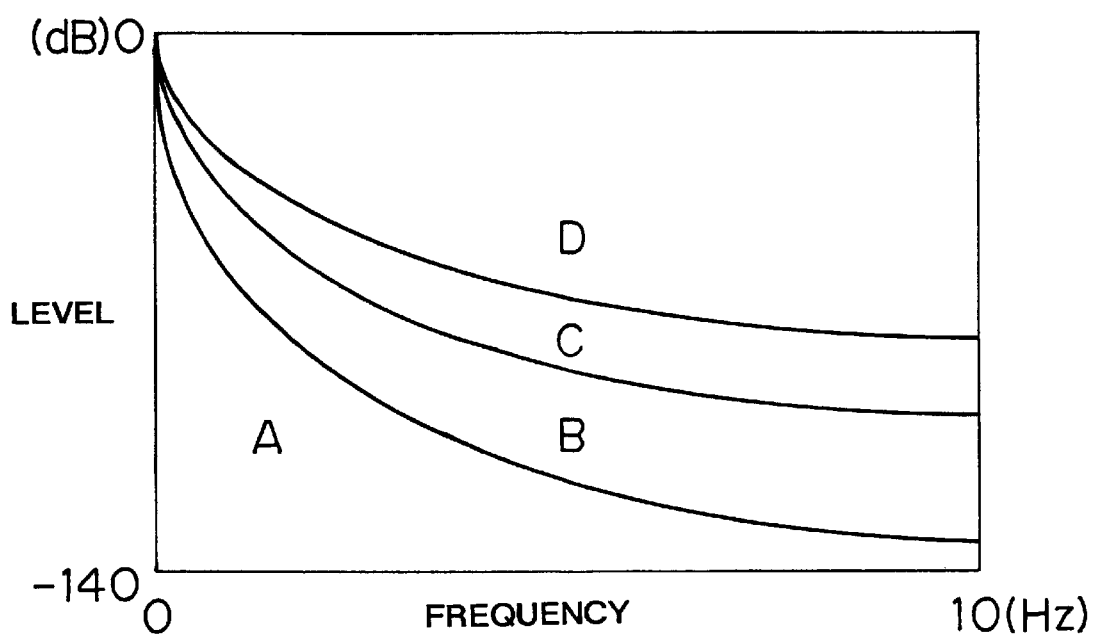
F I G. 14

VEHICLE DECELERATION CONTROL APPARATUS AND CONTROL METHOD FOR THE SAME

INCORPORATION BY REFERENCE

The disclosures of Japanese Patent Application No. 11-357761 filed on Dec. 16, 1999 and No. 2000-108295 filed on Apr. 10, 2000 including the specification, drawings and abstract are incorporated herein by reference in their entirety.

BACKGROUND OF THE INVENTION

1. Field of the Invention

This invention relates to a vehicle deceleration control apparatus that gives deceleration to the vehicle and a control method for the same. More particularly, the invention relates to a vehicle deceleration control apparatus that gives deceleration to the vehicle in accordance with operating conditions of the accelerator and a control method for the same.

2. Description of Related Art

One known arrangement relating to this invention is a deceleration control apparatus that gives deceleration to the vehicle by applying a braking force when the driver releases an accelerator pedal from the depressed state. Japanese Patent Application Laid-Open Publication HEI 9-95222, discloses a deceleration control apparaus, in which a braking force is applied to a main brake system when the accelerator pedal is in a deceleration zone.

Equipping a vehicle with such a deceleration control apparatus eliminates the need for the driver to frequently operate the brake pedal when gradually accelerating or decelerating the vehicle, thus enhancing a deceleration response and driving is made easier.

In this known arrangement, deceleration control in consideration of road traffic conditions is not provided. In light traffic conditions, however, it is not particularly necessary to make deceleration greater and a greater deceleration may even give the driver a sense of awkwardness. Under heavy traffic conditions, on the other hand, the driver needs to operate the brake more frequently with a small deceleration, which makes it necessary to augment deceleration for an improved deceleration response.

SUMMARY OF THE INVENTION

An object of the invention is to provide a vehicle deceleration control apparatus that is capable of giving appropriate deceleration according to the traffic conditions.

To achieve the foregoing object, a vehicle deceleration control apparatus according to one embodiment of the invention has an arrangement, in which an accelerator operating condition detecting device is used to detect the operating condition of an accelerator and, when it is determined that the accelerator operating condition is in a return operation condition, a deceleration application device is controlled so as to give deceleration to the vehicle. Further, by evaluating the distance from the vehicle ahead, the vehicle deceleration control apparatus controls using the deceleration application device to make deceleration to be given smaller when the distance is greater than when the distance is shorter.

According to the invention, deceleration to be given is controlled by determining the distance from the vehicle ahead and in accordance with the distance from the vehicle ahead. When the distance from the vehicle ahead is long, deceleration is kept to a small rate to prevent an excessive deceleration from being produced. When the distance from the vehicle ahead is short, deceleration is given more amply. This makes it possible to decelerate the vehicle without requiring frequent braking operations and keep an appropriate distance from the vehicle ahead.

This vehicle may be equipped with a vehicle-to-vehicle distance detecting device that detects the distance from the vehicle ahead and the vehicle deceleration control apparatus according to this invention preferably uses this vehicle-to-vehicle distance detecting device to determine the distance from the vehicle ahead. A laser radar, millimeter wave sensor, and a similar device may be appropriately used for the vehicle-to-vehicle distance detecting device such as this one.

In addition, the vehicle may also be provided with a relative speed detecting device that detects a relative speed with respect to the vehicle ahead, and the data representing the vehicle-to-vehicle distance and the relative speed with respect to the vehicle ahead may be used as a basis for adjusting deceleration. If the vehicle ahead runs faster than the driver's vehicle even with a small distance available between the two vehicles, there is only a little necessity for making deceleration greater.

The distance between the two vehicles may even be evaluated based on fluctuations with time in accelerator operating conditions as detected by the accelerator operating condition detecting device.

The inventor has found that the shorter the distance from the vehicle ahead, the greater are the fluctuations with time in accelerator operating conditions even with the same driver. That is, it is possible to estimate the distance from the vehicle ahead based on the fluctuations with time in accelerator operating conditions. This eliminates the need for providing the vehicle-to-vehicle distance detecting device, thus simplifying the construction of the control device.

It is also preferable that the deceleration to be applied by the deceleration application device be set in accordance with an accelerator operating position detected by the accelerator operating condition detecting device. This allows deceleration to be applied so as to suit the driver's intention by varying deceleration according to the accelerator operating position.

It is preferable that the deceleration application device applies deceleration by controlling a braking force. If a mechanism that aids in the braking force in proportion to a brake operating force is employed, the invention can be embodied with simple modifications.

An embodiment of this invention is not limited to a vehicle deceleration control apparatus such as that described heretofore. Another embodiment of the invention includes, for example, a vehicle equipped with a vehicle deceleration control apparatus and a control method for the vehicle deceleration control apparatus.

BRIEF DESCRIPTION OF THE DRAWINGS

FIG. 6 shows accelerator operating conditions operated by a driver who operates the accelerator pedal mildly with no vehicles ahead.

FIG. 7 shows accelerator operating conditions operated by a driver who operates the accelerator pedal mildly with a vehicle ahead.

FIG. 8 shows accelerator operating conditions operated by a driver who operates the accelerator pedal harshly with no vehicles ahead.

FIG. 9 shows accelerator operating conditions operated by a driver who operates the accelerator pedal harshly with a vehicle ahead.

FIG. 10 shows the results of an FFT analysis made in the operating conditions of FIG. 6.

FIG. 11 shows the results of an FFT analysis made in the operating conditions of FIG. 7.

FIG. 14 shows the results of zoning of accelerator operating conditions as analyzed from the results of the FFT analysis.

DETAILED DESCRIPTION OF PREFERRED EMBODIMENTS

Figure 1:
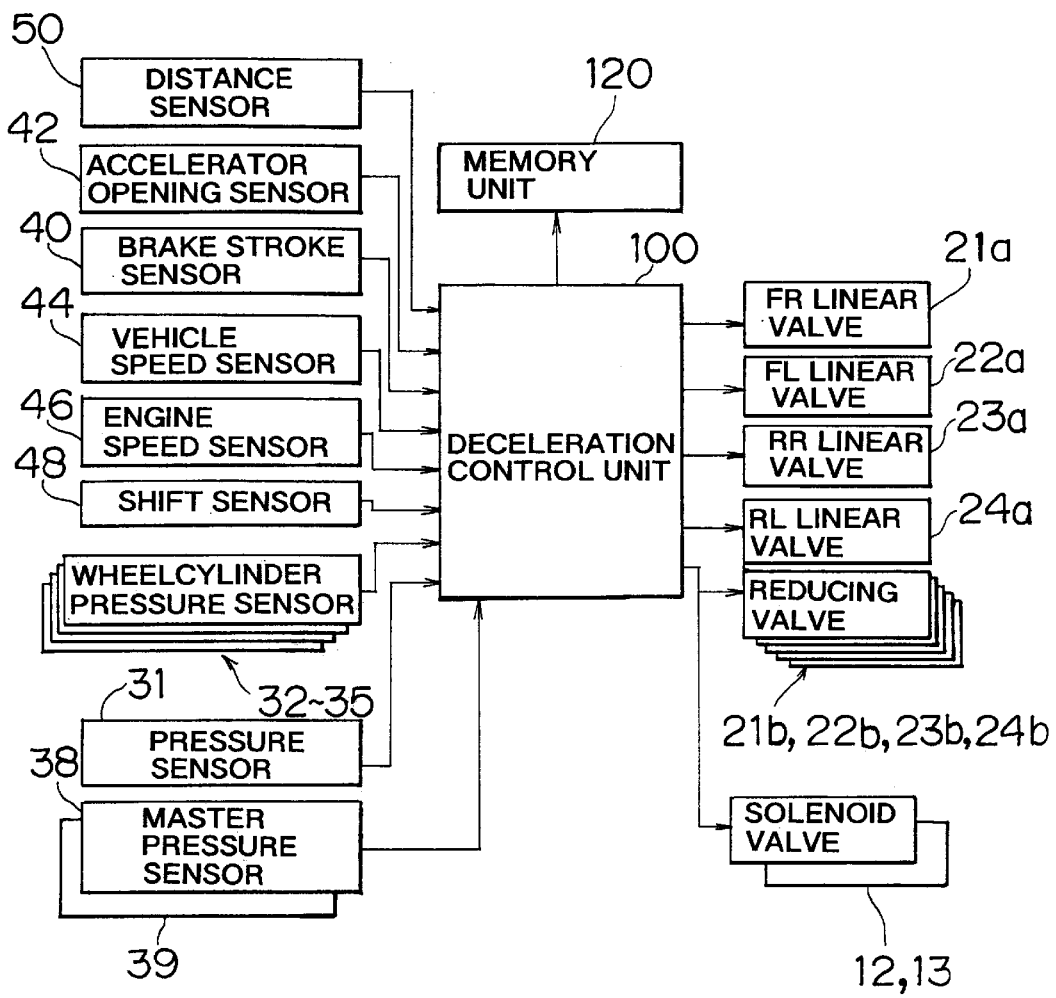
FIG. 1 shows a configuration of a first embodiment of the deceleration control apparatus according to this invention.

The preferred embodiments of the invention will be explained in more detail with reference to the attached drawings. For the sake of easier understanding of the explanations, the same reference numeral is assigned wherever feasible to the same component, applicable to all drawings, and no two explanations are duplicated.

Figure 2:
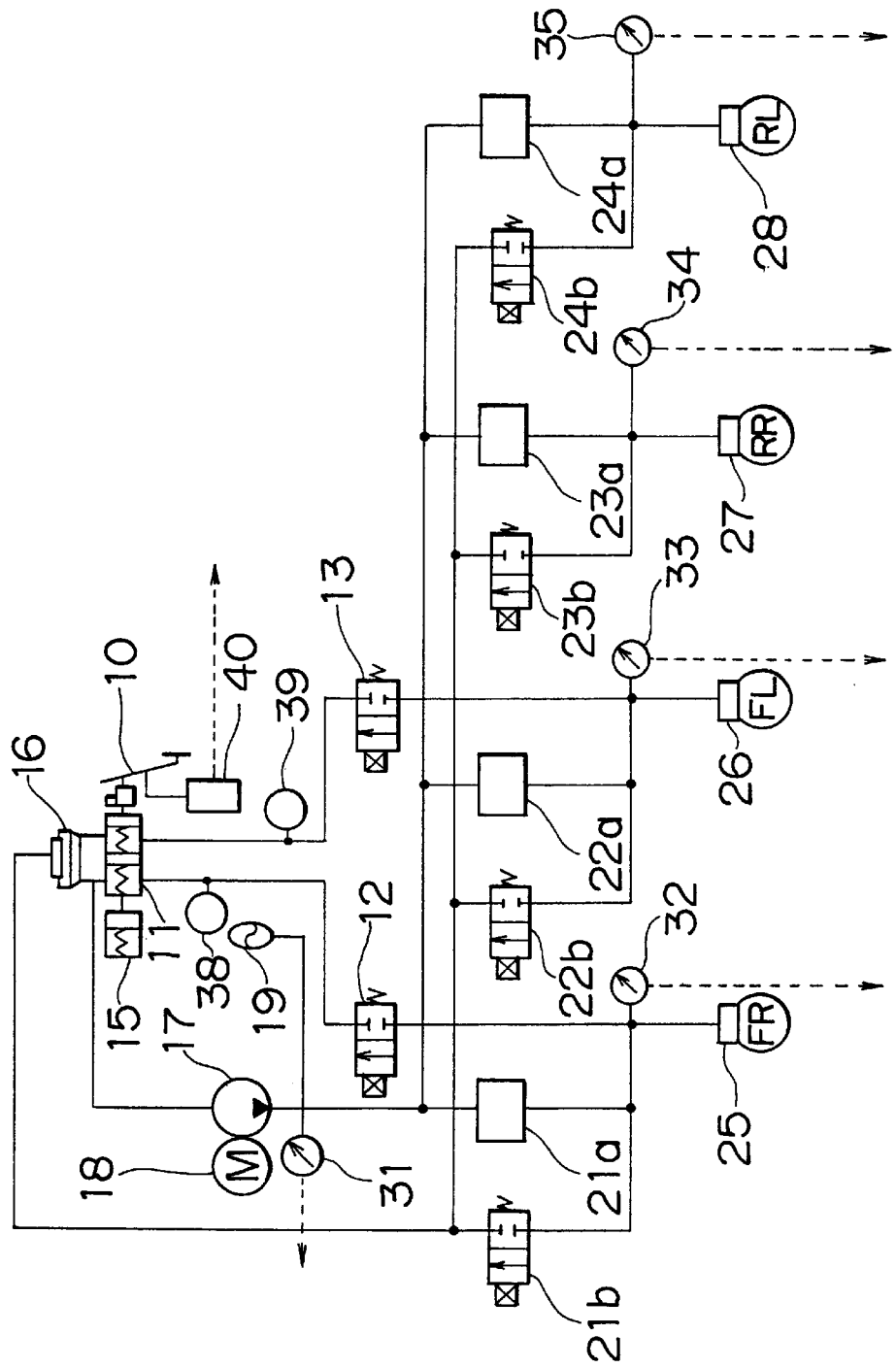
FIG. 2 shows the configuration of a braking system of vehicle equipped with the deceleration control apparatus according to this invention.

FIG. 1 is a block diagram showing the construction of a deceleration control system including a first embodiment of the deceleration control apparatus according to this invention. FIG. 2 shows the construction of a braking system of a vehicle equipped with the deceleration control apparatus according to this invention.

Referring first to FIG. 2, the construction of the vehicle braking system will be explained. Front wheels FR and FL and rear wheels RR and RL of this vehicle are provided with wheel braking wheel cylinders 25 to 28, respectively, that function to provide a braking force to the vehicle.

A brake pedal 10 that operates this braking system is connected to a piston shaft of a master cylinder 11. A brake pressure sensor that detects the operating condition of the brake pedal is connected to the brake pedal 10. A stroke simulator 15 is connected to the master cylinder 11 on a side opposite from the brake pedal 10, generating repulsion in proportion to the operation of the brake pedal 10.

Two hydraulic fluid lines that extend from the master cylinder 11 are connected, respectively, to wheel cylinders 25 and 26 of the right front wheel FR and left front wheel FL via solenoid valves 12 and 13. A master pressure sensor 38 is placed to a path from the master cylinder 11 to the solenoid valve 12 and a master pressure sensor 39 is placed to a path from the master cylinder 11 to the solenoid valve 13.

A hydraulic fluid line that extends from a reservoir tank 16 is connected to a pump 17 driven by a motor 18. A hydraulic fluid line that extends from the pump 17 is connected to wheel cylinders 25 to 28 of the respective wheels by way of linear valves 21a to 24a. A pressure sensor 31 and an accumulator 19 are placed between the pump 17 and a branch point to each of the linear valves 21a to 24a. Reducing valves 21b to 24b are connected, respectively, to return hydraulic fluid lines from the wheel cylinders 25 to 28 to the reservoir tank 16. Wheel cylinder pressure sensors 32 to 35 are mounted, respectively, to wheel cylinders 25 to 28.

A deceleration control unit 100 constitutes a control portion of the vehicle deceleration control apparatus according to the invention. Referring to FIG. 1, signals are supplied to the deceleration control unit 100, output from an accelerator opening sensor 42, a brake stroke sensor 40, a vehicle speed sensor 44, an engine speed sensor 46, a shift sensor 48, a vehicle-to-vehicle distance sensor 50, wheel cylinder pressure sensors 32 to 35, a pressure sensor 31, and master pressure sensors 38 and 39.

Furthermore, the deceleration control unit 100 is provided with a memory unit 120 that stores tables, constants, and other data used for deceleration control. It controls the linear valves 21a to 24a and reducing valves 21b to 24b connected, respectively, to wheel cylinders 25 to 28 and solenoid valves 12, 13.

Reference will be now specifically made to the operations during braking actions provided by this braking system. In a piping circuit downstream of the pump 17, hydraulic fluid sent from the reservoir tank 16 is boosted to, and maintained at, a predetermined pressure level, the accumulator 19 functioning to maintain this pressure. When the pressure of the hydraulic fluid detected by the pressure sensor 31 is below the predetermined pressure level, the pump 17 is driven by the motor 18 to boost the pressure in the downstream piping circuit to the specified level. When the brake pedal 10 is depressed, the piston shaft of the master cylinder 11 is pushed to produce a hydraulic pressure (master pressure) corresponding to the stroke of the brake pedal operated. Under normal conditions, solenoid valves 12 and 13 are in a shutoff state, in which the master pressure is never transmitted directly to the wheel cylinder 25 for the right front wheel FR and the wheel cylinder 26 for the left front wheel FL. The amount of operation of the master cylinder 11 is detected by the master pressure sensors 38, 39. The deceleration control unit 100 computes the hydraulic pressure (wheel cylinder pressure) to be applied to each of the wheel cylinders 25 to 28 according to the amount of master cylinder operation. It controls the operation of each of the linear valves 21a to 24a and reducing valves 21b to 24b, thereby adjusting the wheel cylinder pressure to be applied to each of the wheel cylinders 25 to 28 to a wheel cylinder pressure value obtained through measurement of the pressures taken by the wheel cylinder pressure sensors 32 to 35. By providing an independent control of the wheel cylinder pressure transmitted to each of the wheel cylinders 25 to 28 in this manner, it is possible to control a braking force applied to each wheel independently.

Should the braking system fail, the solenoid valves 12 and 13 are energized to transmit the master pressure of the master cylinder 11 to each of the wheel cylinder 25 of the right front wheel FR and the wheel cylinder 26 of the left front wheel FL via the solenoid valves 12 and 13, thereby braking the two front wheels FR and FL.

Furthermore, the deceleration control apparatus according to the invention provides deceleration control that aids in engine braking effects that are otherwise insufficient in a vehicle equipped with an automatic transmission by adding a braking force to generate deceleration when the accelerator pedal, which has been depressed, is returned. This will be hereinafter referred to as the engine braking assist control.

Figure 3:
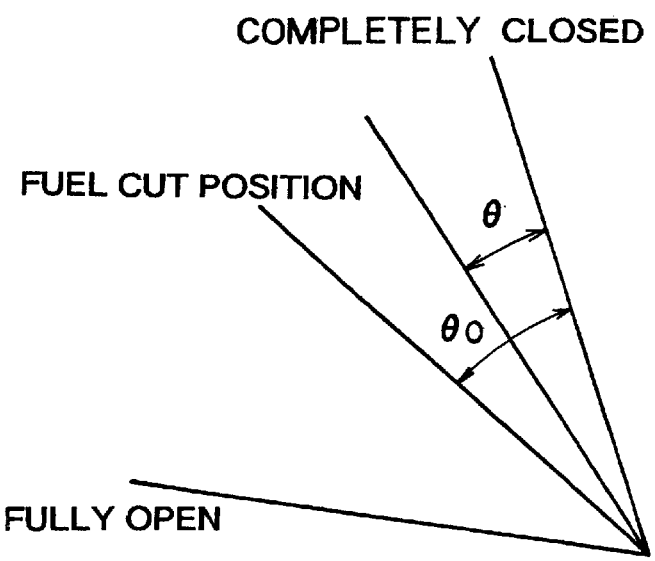
FIG. 3 illustrates the opening of an accelerator pedal.

To be more precise, the deceleration control unit 100 monitors the operating conditions of the accelerator pedal based on the signals output from the accelerator opening sensor 42 mounted on the accelerator pedal. When the accelerator pedal, which has been depressed, is returned, an engine control unit not shown reduces the amount of fuel and air supplies and decreases the engine speed. The resultant resistance generates engine braking effects that provide a braking force. Referring to FIG. 3, if, at this time, the accelerator pedal is returned from a fuel cut position (accelerator opening θ0) to a completely closed position (accelerator opening 0), the deceleration control unit 100 determines that the accelerator pedal is being returned; it then controls the linear valves 21a to 24a and reducing valves 21b to 24b to adjust the hydraulic pressure acting on wheel cylinders 25 to 28, thereby adding a predetermined braking force (assist braking force) to decelerate the vehicle. In mid-to-high-speed regions, when the accelerator pedal is returned from the fuel cut position further to the completely closed position, the engine control unit shuts down the supply of fuel to the engine, thus providing an even greater deceleration.

The current embodiment provides control so as to vary the assist braking force according to the information on the distance from the vehicle ahead obtained from the vehicle-to-vehicle distance sensor 50. A laser radar, millimeter wave sensor, and a similar device may be appropriately used for the vehicle-to-vehicle distance sensor 50. The assist braking force to be given Fa can be expressed by the following equation, where the accelerator opening is θ and (θ equals to or smaller than $θ_0$):

$$Fa = K(θ_0 - θ) \quad (1)$$

Figure 4:
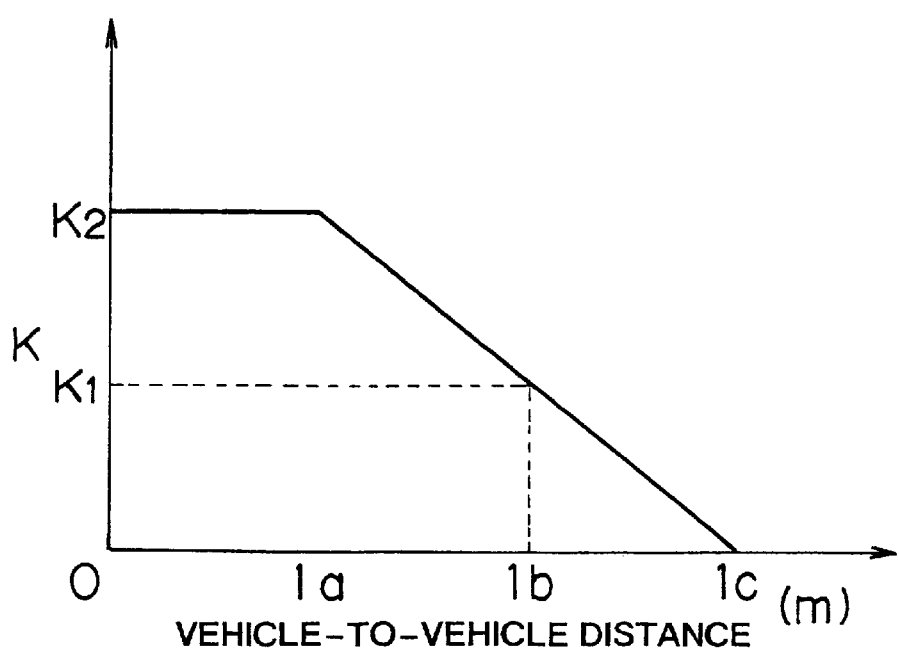
FIG. 4 shows a graph that depicts the relationship between constant K and the vehicle-to-vehicle distance when setting an assist braking force.
Figure 5:
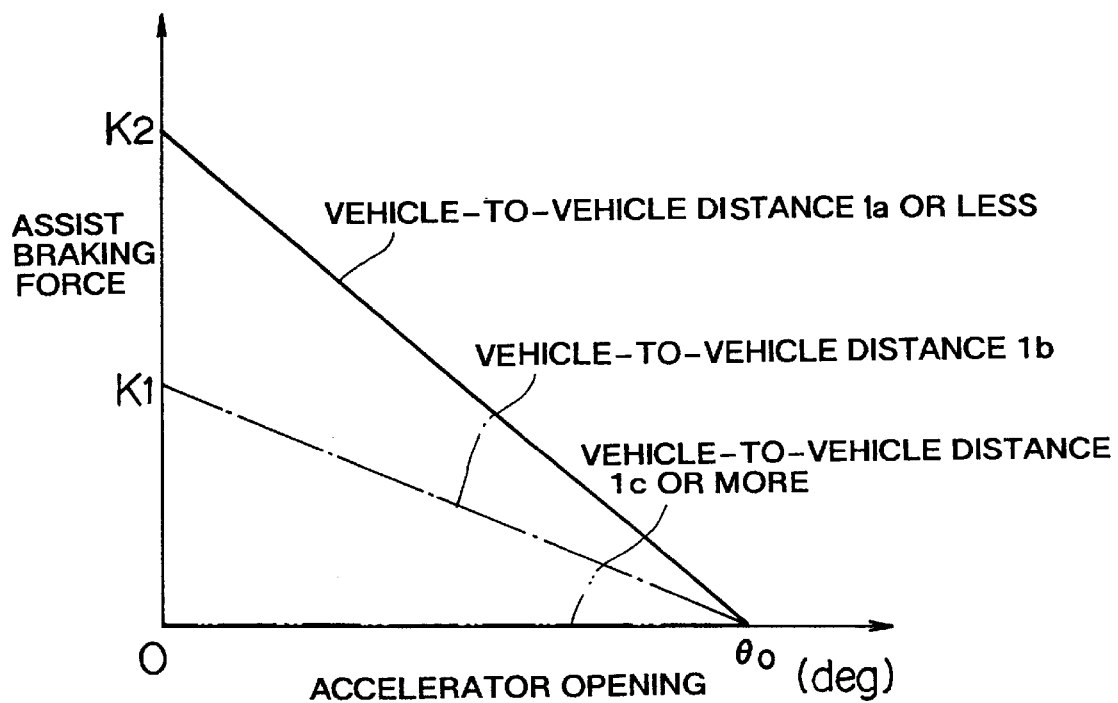
FIG. 5 shows a graph that indicates the relationship between accelerator opening and assist braking force in the embodiment shown in FIG. 1.
Figure 12:
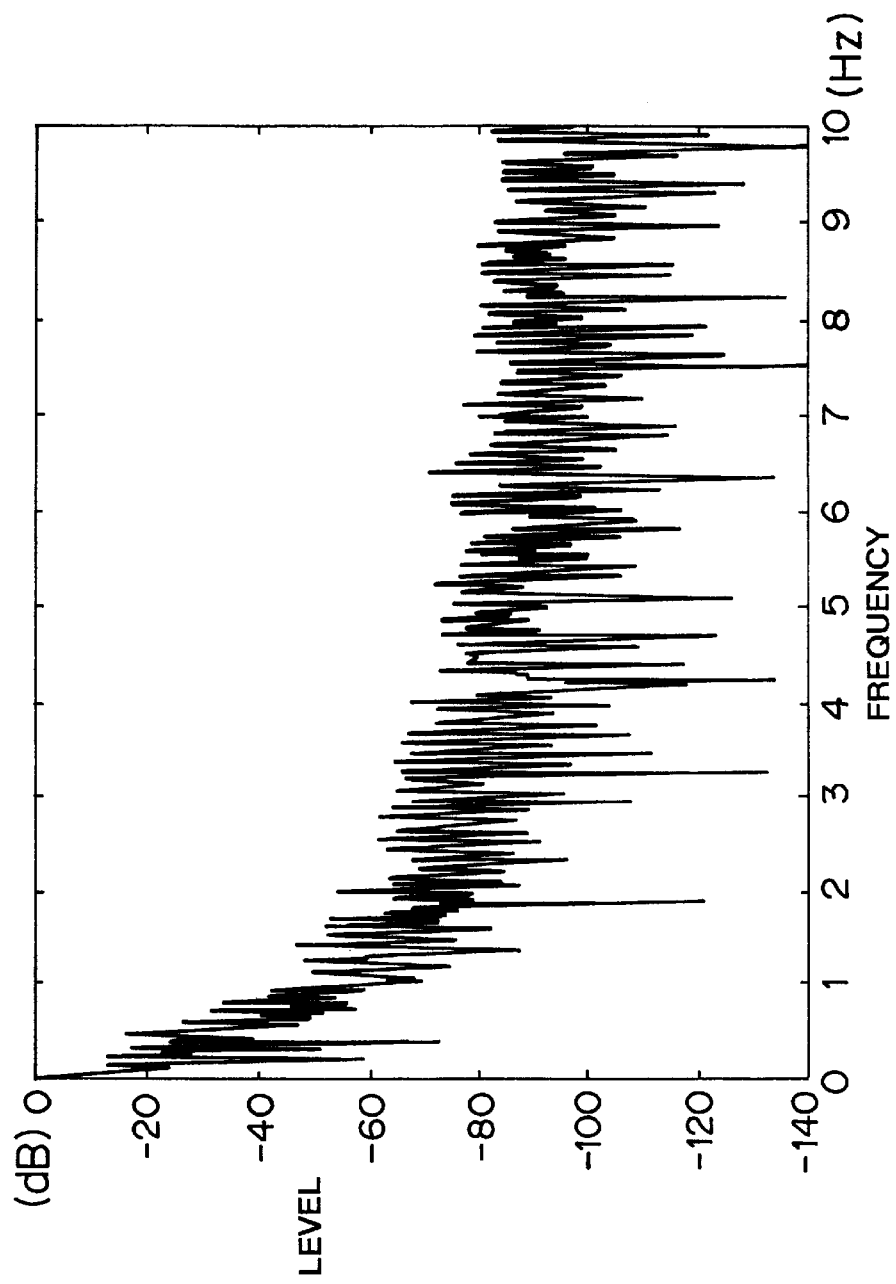
FIG. 12 shows the results of an FFT analysis made in the operating conditions of FIG. 8.
Figure 13:
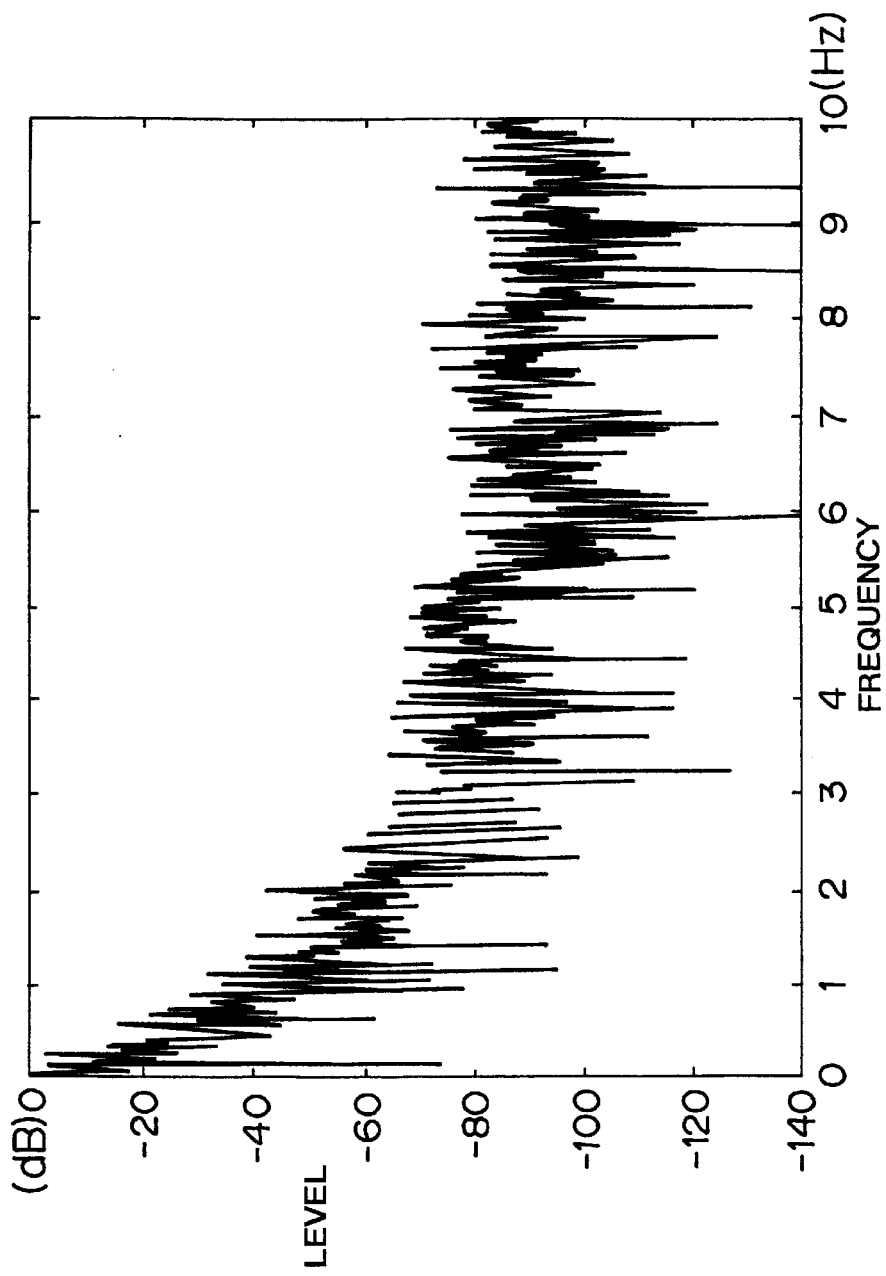
FIG. 13 shows the results of an FFT analysis made in the operating conditions of FIG. 9.

In the above equation, K is a coefficient determined according to the vehicle-to-vehicle distance, set, for example, as shown in FIG. 4. That is, if the vehicle-to-vehicle distance is 1a or less, K is set at the maximum value $K_2$. With the vehicle-to-vehicle distance ranging between 1a and 1c, K decreases as the vehicle-to-vehicle distance increases (for example, it is K1 when the vehicle-to-vehicle distance is 1b) and is set to 0 when the vehicle-to-vehicle distance is 1c or more. FIG. 5 shows the assist braking force obtained in this manner. The shorter the vehicle-to-vehicle distance, the greater is the assist braking force.

If the distance from the vehicle ahead is small, therefore, a greater assist braking force acts, allowing the vehicle to be greatly decelerated by the driver's simply returning the accelerator pedal, thus providing a greater distance from the vehicle ahead. If there is an ample distance from the vehicle ahead, on the other hand, only a small or no assist braking force is produced even when the accelerator pedal is returned, which means that there is no chance of a great deceleration being produced outside the driver's expectation. By adjusting assist braking force according to traffic conditions in this manner, the driver's necessity to frequently perform braking operations is eliminated if the distance from the vehicle ahead is small and generation of an unexpectedly great deceleration can be prevented when the distance from the vehicle ahead is great. Both contribute to better driveability.

A second embodiment of the deceleration control apparatus according to the invention will be explained. The construction of a deceleration control system including this embodiment is the first embodiment shown in FIG. 1 less vehicle-to-vehicle distance sensor 50. Instead of directly measuring the vehicle-to-vehicle distance, the distance is estimated based on the operating conditions of the accelerator pedal.

The inventors examined a number of drivers to determine differences that might exist in accelerator operating conditions according to whether there was a vehicle running ahead of them. FIGS. 6 through 9 are the graphs showing the results of the investigation. FIG. 6 shows accelerator operating conditions operated by a driver who operates the accelerator pedal mildly with no vehicles ahead. FIG. 7 shows accelerator operating conditions operated by a driver who operates the accelerator pedal mildly with a vehicle ahead. FIG. 8 shows accelerator operating conditions operated by a driver who operates the accelerator pedal harshly with no vehicles ahead. FIG. 9 shows accelerator operating conditions operated by a driver who operates the accelerator pedal harshly with a vehicle ahead.

In any of the drivers, there is a common trend noted that, when there is a vehicle running ahead, the drivers tend to operate the accelerator pedal more frequently than when there are no vehicles ahead. With the drivers who operate the accelerator pedal harshly, the accelerator opening frequently reaches 0 (zero) regardless of whether there is a vehicle running ahead or not. The drivers who operate the accelerator pedal mildly, on the other hand, never operate the accelerator pedal to as to return the accelerator opening to 0 even when there is a vehicle running ahead.

FIGS. 10 through 13 show the results of fast Fourier transform (FFT) analysis made of the accelerator operations shown, respectively, in FIGS. 6 through 9. It has been found that, if the driver is the same, there are more high-frequency components present when there is a vehicle ahead and, if the condition of the preceding vehicle remains the same, there are more high-frequency components present with the drivers who operate the accelerator pedal harshly. These results show that four different zones may be established as shown in FIG. 14 according to whether the accelerator pedal is operated mildly or harshly, and whether there is a vehicle running ahead or not. Namely, zone A is the zone into which results of FFT analysis fall of accelerator operations shown in FIGS. 6 and 10, in which the accelerator pedal is operated mildly and there are no vehicles ahead, i.e., there is a distance, for example, of 100 m or more from the vehicle ahead. Likewise, zone B is the zone into which results of FFT analysis fall of accelerator operations shown in FIGS. 7 and 11, in which the accelerator pedal is operated mildly and there is a vehicle ahead, i.e., there is a distance, for example, of less than 100 m from the vehicle ahead. Zone C is the zone into which results of FFT analysis fall of accelerator operations shown in FIGS. 8 and 12, in which the accelerator pedal is operated harshly and there are no vehicles ahead. Zone D is the zone into which results of FFT analysis fall of accelerator operations shown in FIGS. 9 and 13, in which the accelerator pedal is operated harshly and there is a vehicle ahead. That is, identification of a specific zone into which the results of FFT analysis of accelerator operations fall will help estimate whether the accelerator is operated mildly or harshly, and whether there is a vehicle running ahead or not.

To explain the control operations according to this embodiment, a deceleration control unit 100 monitors the output from an accelerator opening sensor 42 and, by making an FFT analysis, determines which of the four zones shown in FIG. 14 the results of FFT analysis of the accelerator operating conditions fall into. If the results fall into zone A or zone C, a small constant K is set in equation (1) to determine the assist braking force. If the results fall into zone B or zone D, on the other hand, a large constant K is set in equation (1) to determine the assist braking force.

In this embodiment, the distance from the vehicle ahead is estimated according to the accelerator operation, not directly measured as in the first embodiment, which results in the estimation accuracy being not very high. As a result, it is preferable that the change in constant K be only gradual and the range of change be smaller than in the first embodiment. Furthermore, the value of constant K may be changed depending on whether the accelerator is operated mildly or harshly.

In this second embodiment, too, adjusting the assist braking force according to traffic conditions will eliminate the need for frequently performing braking operations when the distance from the vehicle ahead is small and prevent an unexpectedly great deceleration from being produced when there is a greater distance from the vehicle ahead. Furthermore, the second embodiment contributes to a reduced cost, though having a degraded accuracy as compared with the first embodiment because of its configuration of requiring no vehicle-to-vehicle distance sensors.

Figure 15:
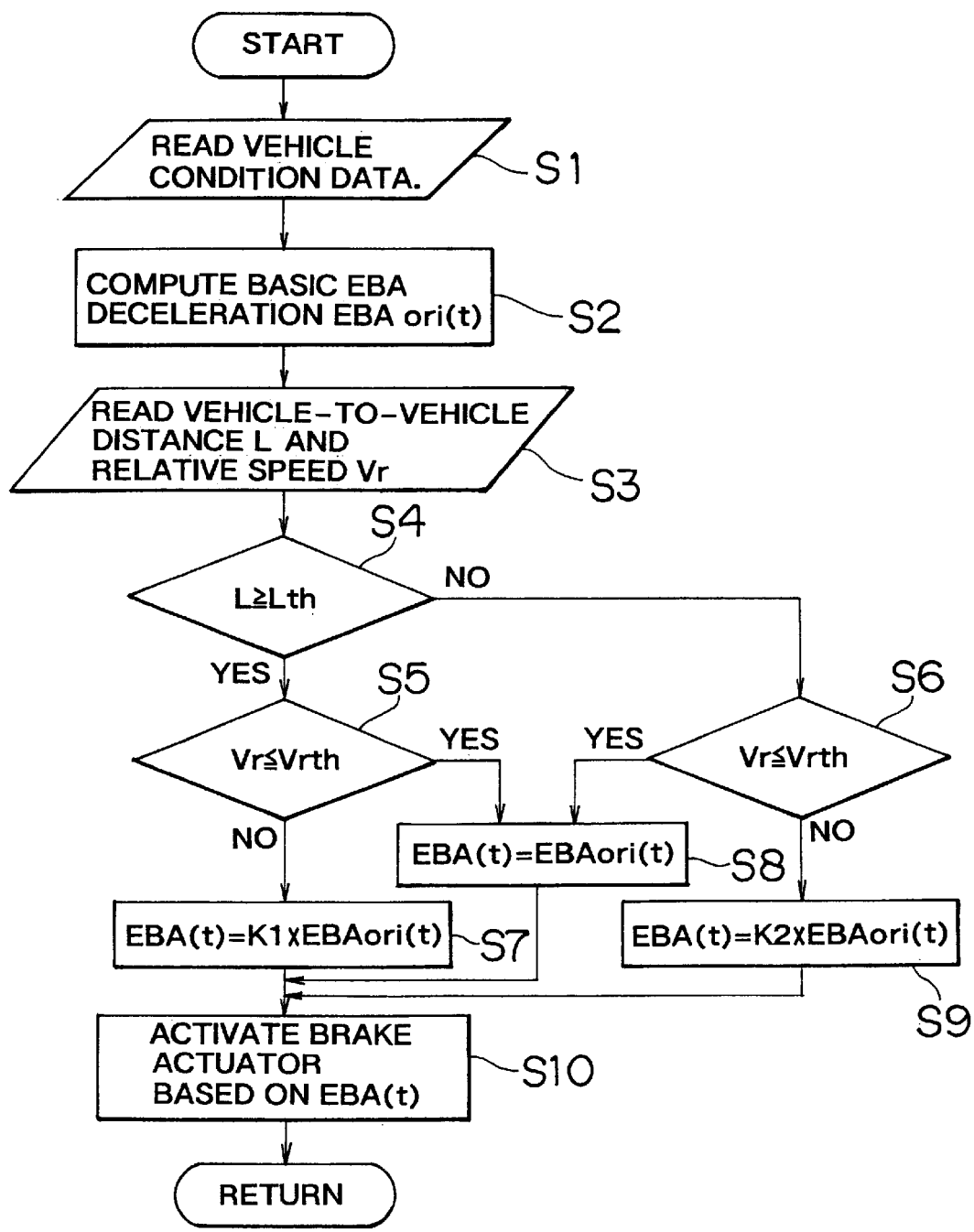
FIG. 15 shows a flowchart of control operations of a third embodiment of the deceleration control apparatus according to this invention.

Referring next to a third embodiment of the deceleration control apparatus according to the invention, the construction of a deceleration control system including this embodiment is the same as that of the first embodiment shown in FIG. 1, while its control operation differs from that of the first embodiment. FIG. 15 shows a flowchart for the control operation of the third embodiment which is performed by a deceleration control unit 100 unless otherwise specified.

In step S1, such information as vehicle speed V obtained from a vehicle speed sensor 44, accelerator opening θ obtained from an accelerator opening sensor 42, and other vehicle condition data including the steering angle, yaw rate, and lateral acceleration are read. In the next step S2, arithmetic operations of the basic deceleration data, i.e., deceleration EBA ori(t) by assist braking force are performed. In step S3, distance from the vehicle ahead L obtained from a vehicle-to-vehicle distance sensor 50 and relative speed Vr are read.

In subsequent steps S4 to S6, the readings of vehicle-to-vehicle distance L and relative speed Vr are compared with their corresponding threshold values Lth and Vrth, respectively, and according to the results of comparison, the operation proceeds to S7, S8, or S9, as required.

The operation proceeds to step S7 if the vehicle-to-vehicle distance L is threshold Lth or more and the relative speed Vr exceeds threshold Vrth. In step S7, the basic EBA deceleration EBA ori(t) obtained in step S2 is multiplied by coefficient K1 of a value greater than 1 to determine the target EBA deceleration EBA(t). In this case, the vehicle tends to approach the vehicle ahead though there is still a large distance from the vehicle ahead. The target deceleration to be given is therefore made large to make the relative speed with respect to the vehicle ahead a negative value, thereby ensuring a good distance from the vehicle ahead.

The operation proceeds to step S8 if the relative speed Vr is threshold Vrth or less, regardless of the vehicle-to-vehicle distance L. In step S8, the basic EBA deceleration EBA ori(t) obtained in step S2 is directly set as the target EBA deceleration EBA(t). In this case, the distance from the vehicle ahead either remains small or tends to enlarge and therefore it is sufficient to keep the basic EBA deceleration for the deceleration to be given.

The operation proceeds to step S9 if the vehicle-to-vehicle distance L is less than threshold Lth, while the relative speed Vr is threshold Vrth or less. In step S9, the basic EBA deceleration EBA ori(t) obtained in step S2 is multiplied by coefficient K2 of a value greater than K1 to determine the target EBA deceleration EBA(t). In this case, the vehicle tends to further approach the vehicle ahead even though there is only a small distance available from the vehicle ahead. The target deceleration to be given is therefore made even greater than in step S7 to make the relative speed with respect to the vehicle ahead a negative value, thereby ensuring a sufficient distance from the vehicle ahead. In step S10, a brake actuator is activated to obtain the EBA deceleration EBA(t) set through these procedures, thereby giving deceleration to the vehicle.

By performing these procedures to provide deceleration control, it becomes easier to adjust the distance from the vehicle ahead by simply adjusting the operation of the accelerator pedal. The control also eliminates the need for operating the brake frequently, enhancing driveability. In the above example, K1 and K2 were constants, but they may nonetheless be varied according to the vehicle-to-vehicle distance and relative speed.

These explanations are based on embodiments in which deceleration is given by directly controlling the braking system. A configuration is still conceivable, in which deceleration is given by acting on a drive system.

According to the invention as explained above, adjusting the assist deceleration given according to traffic conditions will eliminate frequent brake operations and prevent unexpected deceleration from occurring, resulting in an increased driveability.

What is claimed is:

1. A vehicle deceleration control apparatus, comprising:
    an accelerator operating condition detecting device that detects conditions of an accelerator operated by a driver;
    a deceleration application device that gives deceleration to a vehicle; and
    a control device that determines whether the accelerator operation is in a return operation condition based on the results of detection made by the accelerator operating condition detecting device and that, when the accelerator operation is in the return condition and, at the same time, a distance from a vehicle running ahead is evaluated as being long, makes deceleration given to the vehicle by the deceleration application device smaller than when the distance from the vehicle running ahead is short, wherein the control device controls the deceleration given to the vehicle at least based on a depressed position of the accelerator and the deceleration given to the vehicle is different for at least two different depressed positions of the accelerator.

2. A control apparatus according to claim 1, further comprising:
    a vehicle-to-vehicle distance detecting device that detects a distance from a vehicle running ahead,
    wherein the control device adjusts deceleration based on the results of detection made by said vehicle-to-vehicle distance detecting device.

3. A control apparatus according to claim 2, wherein the control device makes deceleration smaller the greater the distance detected by the vehicle-to-vehicle distance detecting device.

4. A control apparatus according to claim 2, further comprising:
    a relative speed detecting device that detects relative speed with respect to a vehicle running ahead wherein
the control device adjusts deceleration based on the detected vehicle-to-vehicle distance and the detected relative speed.

5. A control apparatus according to claim 4, wherein
the control device sets a basic deceleration regardless of relative speed when the vehicle-to-vehicle distance is a predetermined value or less,
sets a first deceleration that is greater than the basic deceleration when the vehicle-to-vehicle distance is the predetermined value or more and relative speed is a predetermined value or less, and
sets a second deceleration that is greater than the first deceleration when the vehicle-to-vehicle distance is the predetermined value or less and relative speed is the predetermined value or less.

6. A control apparatus according to claim 1, wherein
the control device decides the vehicle-to-vehicle distance based on fluctuations with time of an accelerator operating condition detected by the accelerator operating condition detecting device.

7. A control apparatus according to claim 6, wherein
the control device performs a fast Fourier transform of the detected accelerator operating condition and, based on the results of the transform, determines the fluctuations in accelerator operating condition with time.

8. A control apparatus according to claim 1, wherein the accelerator operating condition detecting device detects an accelerator operating position as the accelerator operating condition, the control device adjusts the deceleration given by the deceleration application device according to the detected accelerator operating position.

9. A control apparatus according to claim 1, wherein
the deceleration application device gives deceleration to a vehicle by controlling a braking force applied to said vehicle.

10. A control apparatus according to claim 1, wherein the deceleration application device gives deceleration to said vehicle by controlling a driving force transmitted to wheels.

11. A control apparatus according to claim 1, wherein the deceleration given to the vehicle varies based on a degree of depression of the accelerator and a coefficient determined according to the distance from the vehicle running ahead.

12. A vehicle deceleration control method, comprising the steps of:
detecting a condition of an accelerator operated by a driver;
determining whether the accelerator operating condition detected is in a return operating condition;
setting deceleration given to a vehicle smaller than when a distance from a vehicle ahead is short, if the accelerator operating condition is determined as being in a return operating condition and if the distance from the vehicle ahead is determined to be long, wherein the set deceleration given to the vehicle is at least based on a depressed position of the accelerator and the set deceleration given to the vehicle is different for at least two different depressed positions of the accelerator; and
giving the set deceleration to the vehicle.

13. A control method according to claim 12, further comprising the step of:
detecting the distance from the vehicle ahead,
wherein
deceleration is adjusted based on the detected distance from the vehicle ahead.

14. A control method according to claim 13, wherein
the deceleration is set smaller the greater the detected distance from the vehicle ahead.

15. A control method according to claim 13, further comprising the step of:
detecting relative speed with respect to the vehicle ahead,
wherein
deceleration is adjusted based on the detected distance from the vehicle ahead and the detected relative speed.

16. A control method according to claim 15, wherein
a basic deceleration is set regardless of relative speed if the distance from the vehicle ahead is a predetermined value or less,
a first deceleration that is greater than the basic deceleration is set if the distance from the vehicle ahead is the predetermined value or more and relative speed is a predetermined value or less, and
a second deceleration that is greater than the first deceleration is set if the distance from the vehicle ahead is the predetermined value or less and relative speed is the predetermined value or less.

17. A control method according to claim 12, wherein
the distance from the vehicle ahead is decided based on fluctuations with time in the detected accelerator operating condition.

18. A control method according to claim 17, wherein
the detected accelerator operating condition is subjected to a fast Fourier transform and, based on the results of the transform, fluctuations with time in accelerator operating condition are determined.

19. A control method according to claim 12, wherein deceleration given to the vehicle is adjusted according to an accelerator operating position.

20. A control method according to claim 12, wherein deceleration is given to the vehicle by controlling a braking force to said vehicle.

21. A control method according to claim 12, wherein deceleration is given to the vehicle by controlling a driving force transmitted to said vehicle.

22. A control method according to claim 12, wherein the set deceleration given to the vehicle varies based on a degree of depression of the accelerator and a coefficient determined according to the distance from the vehicle running ahead.

* * * * *